United States Patent
Gan et al.

(10) Patent No.: US 11,363,453 B2
(45) Date of Patent: Jun. 14, 2022

(54) PREPAID DIGITAL DELIVERY SERVICE

(71) Applicant: Kyndryl, Inc., New York, NY (US)

(72) Inventors: Seng Chai Gan, Ashburn, VA (US);
Shikhar Kwatra, San Jose, CA (US);
Vijay Ekambaram, Chennai (IN);
Craig M. Trim, Ventura, CA (US)

(73) Assignee: Kyndryl, Inc., New York, NY (US)

( * ) Notice: Subject to any disclaimer, the term of this patent is extended or adjusted under 35 U.S.C. 154(b) by 13 days.

(21) Appl. No.: 17/023,489

(22) Filed: Sep. 17, 2020

(65) Prior Publication Data
US 2022/0086628 A1  Mar. 17, 2022

(51) Int. Cl.
*H04L 9/06* (2006.01)
*H04W 12/047* (2021.01)
*H04W 12/033* (2021.01)
*H04W 16/24* (2009.01)
*H04W 12/06* (2021.01)

(52) U.S. Cl.
CPC ......... *H04W 12/033* (2021.01); *H04L 9/0618* (2013.01); *H04W 12/047* (2021.01); *H04W 12/068* (2021.01); *H04W 16/24* (2013.01); *H04L 2209/38* (2013.01)

(58) Field of Classification Search
CPC ............. H04W 12/033; H04W 12/047; H04W 12/068; H04W 16/24; H04L 9/0618; H04L 2209/38
See application file for complete search history.

(56) References Cited

U.S. PATENT DOCUMENTS

| | | | |
|---|---|---|---|
| 2016/0174058 A1* | 6/2016 | Lindholm | H04W 52/0261 370/329 |
| 2017/0374065 A1* | 12/2017 | Shtraym | G06K 9/6202 |
| 2019/0140908 A1* | 5/2019 | Ma | H04L 41/12 |
| 2019/0319814 A1 | 10/2019 | Das | |
| 2020/0051137 A1* | 2/2020 | Williams | G06F 16/9537 |

(Continued)

FOREIGN PATENT DOCUMENTS

| | | |
|---|---|---|
| CN | 110611831 A | 12/2019 |
| CN | 110838713 A | 2/2020 |
| CN | 111556573 A | 8/2020 |

(Continued)

OTHER PUBLICATIONS

Sparks et al., "5G Network Slicing Whitepaper", FCC Technological Advisory Council 5G IoT Working Group, Uploaded Jun. 19, 2020, 34 pages.

(Continued)

*Primary Examiner* — Jinsong Hu
*Assistant Examiner* — Farideh Madani
(74) *Attorney, Agent, or Firm* — Erik Swanson, Esq.; Kevin P. Radigan, Esq.; Heslin Rothenberg Farley & Mesiti P.C.

(57) ABSTRACT

Embodiments of the present invention provide methods, computer program products, and systems. In response to receiving a request associated with a data transfer, embodiments of the present invention dynamically determine a first device to facilitate the data transfer. Embodiments of the present invention automatically create a link between the first device that contains data to be transferred and a second device that is an intended recipient for the data.

20 Claims, 3 Drawing Sheets

(56) References Cited

U.S. PATENT DOCUMENTS

2020/0167745 A1\* 5/2020 Shin .................. H04L 67/1097

FOREIGN PATENT DOCUMENTS

| WO | 2017184856 A1 | 10/2017 |
| WO | 2017197273 A1 | 11/2017 |
| WO | 2018035431 A1 | 2/2018 |
| WO | 2018230941 A1 | 12/2018 |

OTHER PUBLICATIONS

Bushaus, Dawn, "5G: Is Platform the Killer Use Case", Jun. 2017, 62 pages.

"Network Slicing Use Case Requirements", GSMA, Apr. 2018, 54 pages.

"Intelligence Empowers Your Business Success", Huawei, Issue 2 | Feb. 2020, 12 pages.

"Offering Experience-Based Subscriptions to Services", An IP.com Prior Art Database Technical Disclosure, IP.com No. IPCOM000219220D, IP.com Electronic Publication Date: Jun. 26, 2012, 21 pages.

Disclosed Anonymously et al., "System, Method, Apparatus, and Computer Program Product for Insurance and Replacement of a Mobile Device", An IP.com Prior Art Database Technical Disclosure, IP.com No. IPCOM000227601D, IP.com Electronic Publication Date: May 8, 2013, 42 pages.

Disclosed Anonymously et al., "Food Donation Delivery Network (FDDN)", An IP.com Prior Art Database Technical Disclosure, IP.com No. IPCOM000261337D, IP.com Electronic Publication Date: Feb. 24, 2020, 5 pages.

International Search Report and Written Opinion for PCT/CN2021/116222, dated Dec. 2, 2021 (9 pages).

\* cited by examiner

PREPAID DIGITAL DELIVERY SERVICE

BACKGROUND

The present invention relates in general to telecommunications networking and Internet of Things (IoT) devices and in particular to creating a virtual digital content delivery platform via 5G network slicing.

Advanced telecommunications networks, including 5G networks, offer certain features that are far more sophisticated and flexible than predecessor technologies. For example, 4G networks offer trilateration capabilities that allow a carrier to locate a user's position within about a hundred feet by comparing signals from multiple cell towers. 5G and later networks, however, can trilaterate a device's location with at least one order-of-magnitude greater precision, allowing a user's position to be identified within a range of tens of feet.

5G and similar networks can also handle far more simultaneous connections, making them more practical for Internet of Things applications, which can associate numerous IoT sensor devices with a single user. Such networks can also open high-bandwidth ad hoc channels that exhibit very low latency, allowing large groups of users to connect and disconnect at will in a dynamic mesh network. In addition, these networks can integrate artificially intelligent or cognitive applications directly into their network infrastructure, rather than requiring such functionality to be implemented as extrinsic services hosted by a cloud-computing service or other third-party resource.

5G networks enable the mass deployment of IoT devices by providing the ability to dynamically manage very large numbers of devices on ad hoc mesh networks. If, for example, a thousand people watching a parade are each carrying an average of five IoT devices, a legacy Internet Service Provider (ISP) would likely be unable to simultaneously manage and correlate the resulting large number of connections. The flexible service-orchestration capabilities of a 5G network, on the other hand, after detecting the presence of a mass assembly, allow the network to dynamically create an ad hoc mesh network that continuously adds and removes users as IoT devices log in and log out. Unlike legacy networks, which would require an extrinsic application, such as a hosted cloud service, to even approximate such features, 5G platforms support such high-speed ad hoc infrastructure through integrated, native orchestration services.

5G network slicing typically refers to a network architecture that enables the multiplexing of virtualized and independent logical networks on the same physical network infrastructure. Each network slice is an isolated end-to-end network tailored to fulfill diverse requirements requested by a particular application or service. In this manner, network slices allow for different service level requirements (SLR) to be met. The realization of this service-oriented view of the network leverages on the concepts of software-defined networking (SDN) and network function virtualization (NFV) that allow the implementation of flexible and scalable network slices on top of a common network infrastructure.

In general, network slicing "slices" the original network architecture in multiple logical and independent networks that are configured to effectively meet the various services requirements. To quantitatively realize such concept, several techniques are employed. For example, network functions provide building blocks to create every network slice. Virtualization provides an abstract representation of the physical resources under a unified and homogeneous scheme and enables a scalable slice deployment relying on NFV that allows to decouple each network function instance from the network hardware it runs on. Finally, orchestration allows coordination of all the different network components that are involved in the life cycle of each network slice. In this context, SDN is employed to enable a dynamic and flexible slice configuration.

From a high-level perspective, the network slicing architecture can be considered as composed by two mains blocks, one dedicated to the actual slice implementation and the other dedicated to the slice management and configuration. The first block is designed as a multi-tier architecture composed by three layers (service layer, network function layer, infrastructure layer), where each one contributes to the slice definition and deployment with distinct tasks. The second block is designed as a centralized network entity, generically denoted as network slice controller, that monitors and manages the functionalities between the three layers to efficiently coordinate the coexistence of multiple slices.

SUMMARY

According to an aspect of the present invention, there is provided a computer-implemented method. The method comprises in response to receiving a request associated with a data transfer, dynamically determining a first device to facilitate the data transfer; and automatically creating a link between the first device that contains data to be transferred and a second device that is an intended recipient for the data.

BRIEF DESCRIPTION OF THE DRAWINGS

Preferred embodiments of the present invention will now be described, by way of example only, with reference to the following drawings, in which.

DETAILED DESCRIPTION

Embodiments of the present invention recognize that transferring media content from one user to another user can utilize resources. In some cases, transferring media content can be complicated when the recipient does not have access to a network in which media content can be transferred. As such, the recipient may not be able to receive the media content intended for the recipient. Embodiments of the present invention provide solutions for dynamically creating a link (e.g., via tunneling) between the sender and the user who does not have access to a network. For example, embodiments of the present invention can locate a device nearby the user that has network access and utilized the located device into a virtual digital content shipping platform that can pull information from a blockchain network via one-time password authentication and data mapping. Embodiments of the present invention can then establish a link between the nearby device and a sender that needs to transfer content to the recipient as discussed in greater detail later in this Specification. Accordingly, embodiments of the present invention can transfer the media content between the sender and the recipient via the established link.

Figure 1:
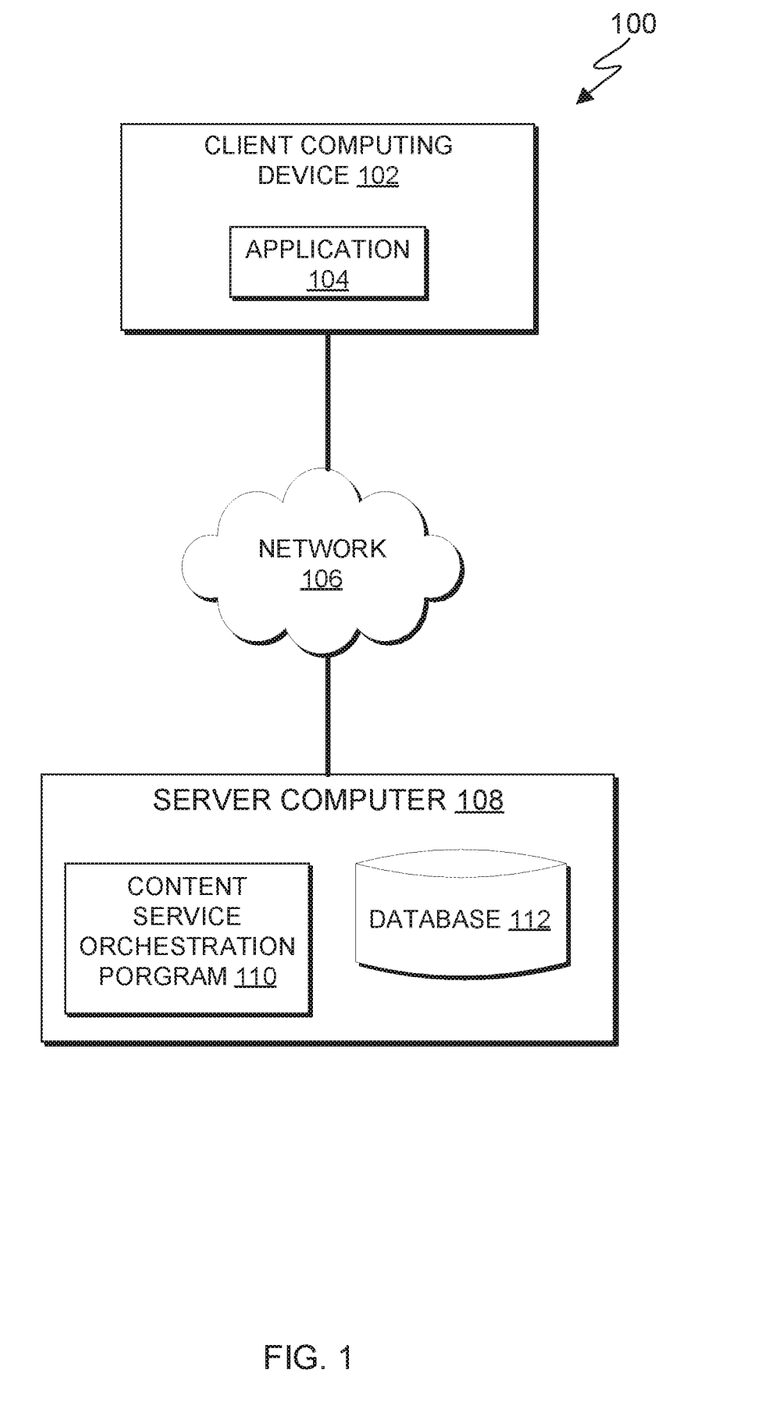
FIG. 1 depicts a block diagram of a computing environment, in accordance with an embodiment of the present invention.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. Client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computer as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 5.

In this embodiment, client computing device 102 is a user device associated with a user and includes application 104. Application 104 communicates with server computer 108 to access content service orchestration program 110 (e.g., using TCP/IP) to access content, user information, and database information. Application 104 can further communicate with content service orchestration program 110 to transmit instructions automatically create a link as discussed in greater detail with regard to FIGS. 2-3.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts content service orchestration program 110 and database 112. In some embodiments server computer 108 can include a virtual database frame (not shown). In this embodiment, content service orchestration program 110 resides on server computer 108. In other embodiments, content service orchestration program 110 can have an instance of the program (not shown) stored locally on client computer device 102. In yet other embodiments, content service orchestration program 110 can be stored on any number or computing devices.

In this embodiment, content service orchestration program 110 automatically creates a link between two devices to transfer content based, at least in part on a received request, size of content, Quality of Service (QoS), and any Service Level Agreement (SLA). In some embodiments, content service orchestration program 110 can register the received content and the request to transfer content with a block chain network.

In this embodiment, content, as used herein refers to material information and experiences that are directed toward an end user (e.g., a recipient). Content can be expressed through some medium, as speech, writing or any of various art. For example, content can include one or more textual information, pictorial, audio, visual, and graphic information. Content can also include one or more files and extensions (e.g., file extensions such as .doc, .docx, .odt, .pdf, .rtf.txt, .wpd, etc, Posts can further include audio (e.g., .m4a, .mp3, .mp4, .wave. wma, etc.) visual/image (e.g., .jpeg, .tiff, .bmp, .pdf, .gif etc.).

Figure 2:
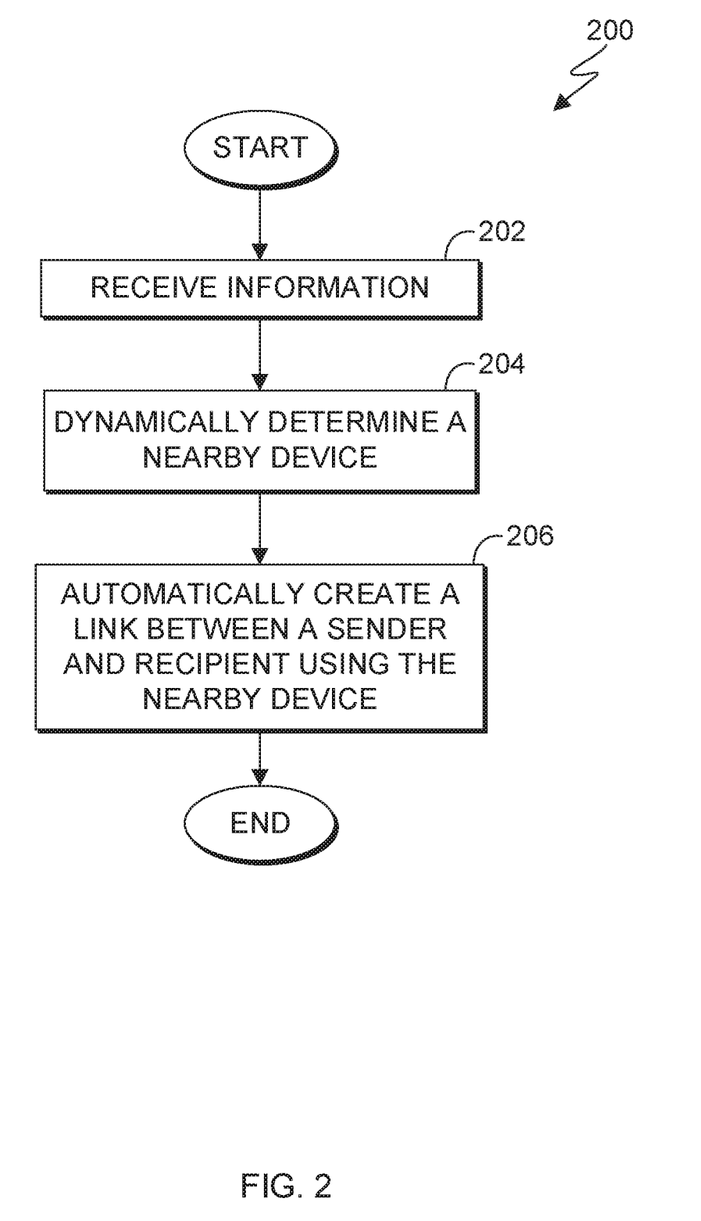
FIG. 2 is a flowchart depicting operational steps for automatically creating a link, in accordance with an embodiment of the present invention.

In this embodiment, content service orchestration program 110 can include an encryption module (not shown) that encrypts received content), and optimization module (not shown) that can determine options for transferring (i.e., delivering) content), and an authorization module (not shown) that confirms details associated with the transaction (e.g., a received request from a sender, a method of transferring (i.e., delivery), costs, and recipient) that are leveraged by content service orchestration program 110 to dynamically creates a link between two devices as described in greater detail with regard to FIG. 2.

For example, content service orchestration program 110 can utilize the optimization module to determine cost to transfer received content. In this embodiment, "cost" can refer to one or more resources used to facilitate transfer content. For example, cost can include monetary costs associated with connection to a server that facilitates transfer of content. Cost can also include use of resources of devices facilitating the transfer of content (e.g., bandwidth, processing speed, RAM, etc.). Cost can also include constraints specified by either sender or recipient. For example, the delivery medium can be a shipping label and the shipping level can specify size of content (e.g., files) being transferred, QoS requirements, etc. In certain circumstances, content service orchestration program 110 can consider proximity of a device to either a sender or an intended recipient as part of the cost.

In this embodiment, content service orchestration program 110 automatically creates a link between two devices to transfer content in response to a received request to transfer content. In this embodiment, content service orchestration program 110 can automatically encrypt received content. In some embodiments, content service orchestration program 110 can add another layer of security by requiring a One-Time Password (OTP) to access the encrypted content.

Content service orchestration program 110 can then use the optimization module to determine cost associated with the transfer. Content service orchestration program 110 can then identify a device to facilitate transfer of media content based on the determined cost as described in greater detail with regard to FIG. 2. For example, in some embodiments, content service orchestration can identify a device that can facilitate transfer of media content within a physical proximity to the sender based on the received information (e.g., requirements). In other embodiments, a user (e.g., a sender), can specify a device to facilitate the transfer. Content service orchestration program 110 can then request authentication (i.e., verify transfer details). In response to verifying transfer details, content service orchestration program 110 can create a link between the identified device and the sender's device.

In this embodiment, content service orchestration program 110 can then transmit a pre-packaged label that, when interacted with, establishes the link (e.g., tunneling) between the sender and the recipient. In this embodiment, the content service orchestration program 110 can create a link between the sender and the recipient via a two-hop network. For example, content service orchestration program 110 can first create a link between the sender device and the identified device that can facilitate the data transfer via a local network (e.g., Bluetooth, WiFi, Near Field Communication (NFC), RFID, etc.). Content service orchestration program 110 can then create a link between the identified device and the recipient device via 5G networking slicing using the prepaid digital label. Content service orchestration program 110 can then transfer the encrypted content utilizing a 5G sliced network.

For example, in a country, a local cell phone (e.g., user device call) is free, however, data transfer over the cellular network can be expensive. In this example, Person A (e.g., a recipient, defined as user requested content) needs to a one gigabyte file from Person B (e.g., a sender). In this example, Person A has a prepaid digital shipping label. Person B has selected to use Person C's mobile device (e.g., a shipping application such as content service orchestration program 110) to read the shipping label and input the one gigabyte file. Continuing the example, content service orchestration program 110 can connect to a roaming authentication server to facilitate the content (i.e., data) transfer (e.g., by paying for the data transfer charge). In response to positive verification of the data transfer, content orchestration program 110 can then use separate 5G sliced network in combination with a mobile network to send the file to a shipping server with instructions to transmit the one gigabyte file to Person A.

In certain embodiments, content service orchestration program 110 can provide one or more incentives to users associated with the identified device that is used to facilitate transfer of content.

In general, database 112 can be implemented using any non-volatile storage media known in the art. For example, database 112 can be implemented with a tape library, optical library, one or more independent hard disk drives, or multiple hard disk drives in a redundant array of independent disk (RAID). In this embodiment database 112 is stored on server computer 108.

FIG. 2 is a flowchart 200 depicting operational steps for automatically creating a link, in accordance with an embodiment of the present invention.

In step 202, content service orchestration program 110 receives information. In this embodiment, content service orchestration program 110 receives a request from client computing device 102. In other embodiments, content service orchestration program 110 can receive information from one or more other components of computing environment 100.

In this embodiment, information can include a request for content (e.g., by a recipient). The information can also specify a registered user device associated with the user requesting content (e.g., the recipient). Conversely, information can also be a request to send content (e.g., by a sender). A request can further include one or more other parameters needed to facilitate data transfer (e.g., proximity to a user, bandwidth, cost, etc.).

In some circumstances, information can be used to create a prepaid digital shipping label that can be used to create a link between a sender of content and the recipient of the content. In other embodiments, the information (e.g., registered recipient device, file size, QoS requirements, etc.) can be included in a digital, prepaid shipping label and registered within a public blockchain network. Information can also include user preferences (e.g., specified privacy settings, stored privacy rules, device proximity, etc.).

In step 204, content service orchestration program 110 dynamically determines a nearby device within a proximity to the recipient. In this embodiment, content service orchestration program 110 dynamically determines a nearby device to the recipient based on requirements specified in the received information. For example, content service orchestration program 110 can leverage an optimization module to determine an optimal cost for a user (e.g., either sender or recipient) to send and subsequently receive a data transfer.

As mentioned earlier a cost can refer to one or more resources used to facilitate transfer content. For example, cost can include monetary costs associated with connection to a server that facilitates transfer of content. Cost can also include use of resources of devices facilitating the transfer of content (e.g., bandwidth, processing speed, RAM, etc.). Cost can also include constraints specified by either sender or recipient. For example, the delivery medium can be a shipping label and the shipping level can specify size of content (e.g., files) being transferred, QoS requirements, etc. In certain circumstances, content service orchestration program 110 can consider proximity of a device to either a sender or an intended recipient as part of the cost.

In an embodiment, where the received information (e.g., shipping label) specifies a speed of transfer, content service orchestration program 110 can leverage an optimization module to identify the required speed of transfer is satisfied by a device within twenty feet of the recipient device. Content service orchestration program 110 can then identify devices within twenty feet of the recipient device using a combination of WiFi, Bluetooth, and NFC signals to identify devices within twenty feet of the recipient device.

In this embodiment, "nearby" as used herein, refers to a proximity to either the sender or recipient defined by a radius. Nearby can be defined by user requirements (e.g., by physical or logical proximity).

In another example, the sender or the recipient can specify a user device to facilitate the data transfer. For example, content service orchestration program 110 can receive a request from a sender to send content to a recipient. In this example, the recipient has transmitted and registered information (e.g., a number of a device associated with the recipient) to a public blockchain in the form of a pre-paid shipping label and subsequently send the information to the sender (e.g., the shipping label and an included one-time password). In this example, the sender has identified a device to facilitate the data transfer and enters the information (e.g., the number associated with the recipient device and the one-time password).

In either embodiment, content service orchestration program 110 can confirm that the determined (i.e., identified) user device will participate. In this embodiment, content service orchestration program 110 can generate a notification to the user of the identified device requesting participation. In response to receiving confirmation, content service orchestration program 110 can verify or otherwise authenticate the identified user device by requiring the user associated with the identified device to enter a one-time password generated and sent to the sender. In this embodiment, the sender can choose to transmit the one-time password to the user associated with the identified device. In another embodiment, the one-time password can automatically be sent to the user associated with the identified device.

In step 206, content service orchestration program 110 automatically creates a link between a sender and a recipient using the nearby device. In this embodiment, content service orchestration program 110 automatically creates a link between the sender and the recipient using the nearby device in response to receiving an input entered on the identified user device (e.g., the nearby device) that matches the one-time password sent to the sender. In this embodiment, content service orchestration program 110 creates the link using the information from the prepaid digital label from the device associated with the sender, to the identified nearby device, and the device associated with the recipient.

In scenarios where the sender has specified a user device that will be used (e.g., within a certain radius of the sender) for transfer of content (e.g., data transfer), content service orchestration program 110 can create a link between the sender and the specified user device via a local network (e.g., Bluetooth, LAN, etc.). Content service orchestration program 110 can then establish a link from the specified user device to the recipient device via 5G network slicing using the prepaid digital label.

Accordingly, content service orchestration program 110 can then initiate and complete the data transfer of content from a device associated with the sender to the recipient.

Figure 3:
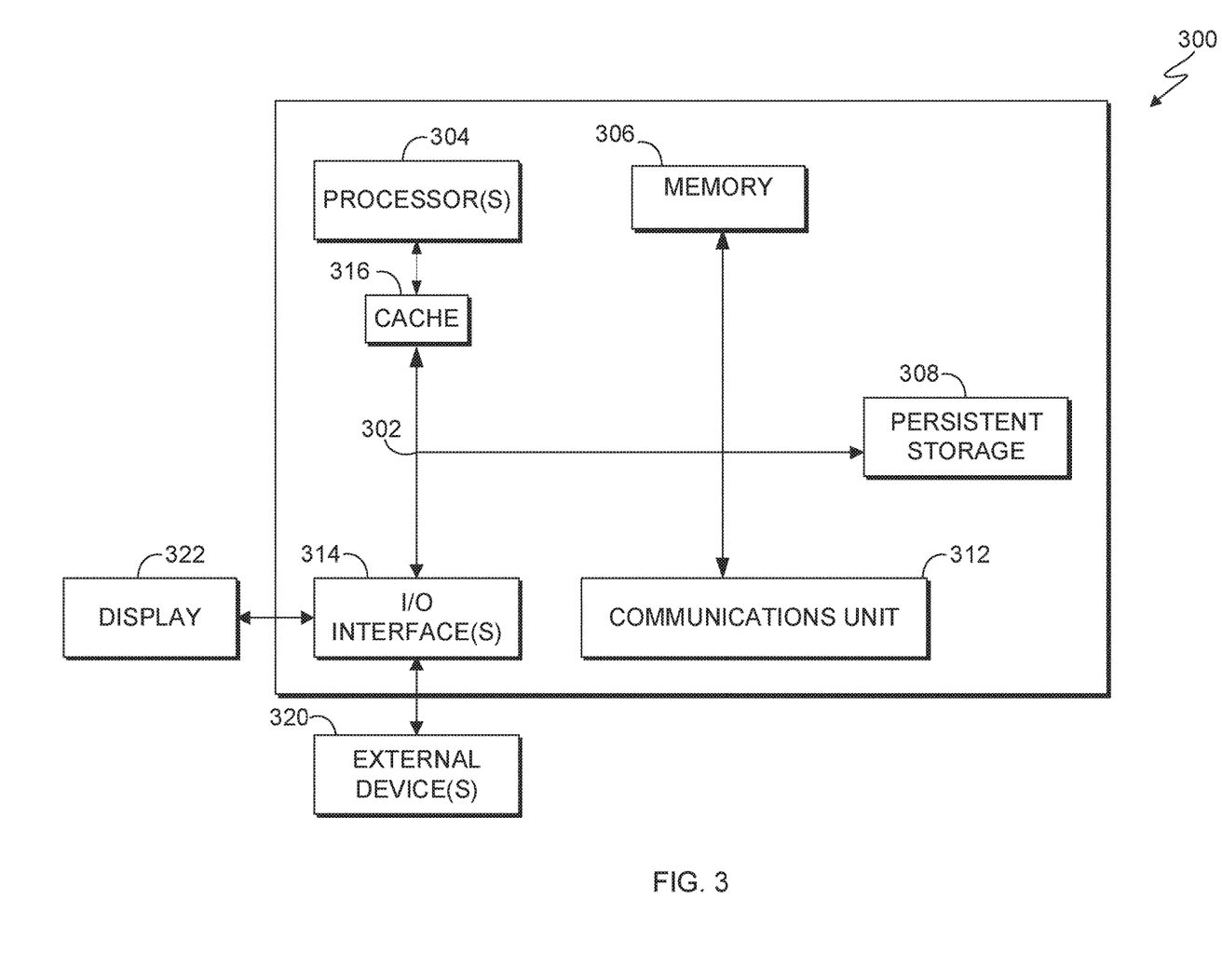
FIG. 3 is a block diagram of an example system, in accordance with an embodiment of the present invention.

FIG. 3 depicts a block diagram of components of computing systems within computing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 300 includes communications fabric 302, which provides communications between cache 316, memory 306, persistent storage 308, communications unit 312, and input/output (I/O) interface(s) 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Content service orchestration program 110 (not shown) may be stored in persistent storage 308 and in memory 306 for execution by one or more of the respective computer processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 312, in these examples, provides for communications with other data processing systems or devices. In these examples, communications unit 312 includes one or more network interface cards. Communications unit 312 may provide communications through the use of either or both physical and wireless communications links. Content service orchestration program 110 may be downloaded to persistent storage 308 through communications unit 312.

I/O interface(s) 314 allows for input and output of data with other devices that may be connected to client computing device and/or server computer. For example, I/O interface 514 may provide a connection to external devices 320 such as a keyboard, keypad, a touch screen, and/or some other suitable input device. External devices 320 can also include portable computer readable storage media such as, for example, thumb drives, portable optical or magnetic disks, and memory cards. Software and data used to practice embodiments of the present invention, e.g., content service orchestration program 110, can be stored on such portable computer readable storage media and can be loaded onto persistent storage 308 via I/O interface(s) 314. I/O interface(s) 314 also connect to a display 322.

Display 322 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   in response to receiving a request associated with a data transfer, dynamically determining a nearby device to facilitate the data transfer; and
   automatically creating a link between a first device that contains data to be transferred and a second device that is an intended recipient for the data using the dynamically determined nearby device, the automatically creating the link comprising:
      establishing the link through the nearby device using a first network and a second network, the second network being a 5G networking slice, the establishing including:
         transmitting a digital label to the nearby device for use in establishing, at least in part, the link, the digital label including information based on the received request, size of the data to be transferred, and Quality of Service (QoS) requirements.

2. The computer-implemented method of claim 1, wherein the link between the first device that contains the data to be transferred and the second device that is an intended recipient for the data is a two-hop network.

3. The computer-implemented method of claim 2, wherein the two-hop network comprises:
the first network that is a local network that connects the first device and the nearby device; and
the second network that is a 5G networking slice that is generated in response to receiving the request.

4. The computer-implemented method of claim 1, wherein dynamically determining the nearby device to facilitate the data transfer comprises:
identifying devices within a proximity to the first device; and
selecting the nearby device from the identified devices that satisfies the received request.

5. The computer-implemented method of claim 1, wherein the request includes content and one or more parameters needed to facilitate the data transfer.

6. The computer-implemented method of claim 1, further comprising:
receiving content to be transferred during the data transfer;
encrypting the received content to be transferred; and
transmitting the encrypted content to a blockchain server.

7. The computer-implemented method of claim 6, further comprising:
generating a one-time password for the encrypted content;
sending the generated one-time password for the encrypted content to the first device; and
in response to receiving a request for the encrypted content by the nearby device, requesting the generated one-time password.

8. A computer program product comprising:
one or more computer readable storage media and program instructions stored on the one or more computer readable storage media, the program instructions comprising:
program instructions to in response to receiving a request associated with a data transfer, dynamically determining a nearby first device to facilitate the data transfer; and
program instructions to automatically creating a link between the first device that contains data to be transferred and a second device that is an intended recipient for the data using the dynamically determined nearby device, the automatically creating the link comprising:
establishing the link through the nearby device using a first network and a second network, the second network being a 5G networking slice, the establishing including:
transmitting a digital label to the nearby device for use in establishing, at least in part, the link, the digital label including information based on the received request, size of the data to be transferred, and Quality of Service (QoS) requirements.

9. The computer program product of claim 8, wherein the link between the first device that contains the data to be transferred and the second device that is an intended recipient for the data is a two-hop network.

10. The computer program product of claim 9, wherein the two-hop network comprises:
the first network that is a local network that connects the first device and the nearby device; and
the second network that is a 5G networking slice that is generated in response to receiving the request.

11. The computer program product of claim 8, wherein the program instructions to dynamically determining the nearby device to facilitate the data transfer comprise:
program instructions to identify devices within a proximity to the first device; and
program instructions to select the nearby device from the identified devices that satisfies the received request.

12. The computer program product of claim 8, wherein the request includes content and one or more parameters needed to facilitate the data transfer.

13. The computer program product of claim 8, wherein the program instructions stored on the one or more computer readable storage media further comprise:
program instructions to receive content to be transferred during the data transfer;
program instructions to encrypt the received content to be transferred; and
program instructions to transmit the encrypted content to a blockchain server.

14. The computer program product of claim 13, wherein the program instructions stored on the one or more computer readable storage media further comprise:
program instructions to generate a one-time password for the encrypted content;
program instructions to send the generated one-time password for the encrypted content to the first device; and
program instructions to, in response to receiving a request for the encrypted content by the nearby device, request the generated one-time password.

15. A computer system for comprising:
one or more computer processors;
one or more computer readable storage media; and
program instructions stored on the one or more computer readable storage media for execution by at least one of the one or more computer processors, the program instructions comprising:
program instructions to in response to receiving a request associated with a data transfer, dynamically determining a nearby first device to facilitate the data transfer; and
program instructions to automatically creating a link between the first device that contains data to be transferred and a second device that is an intended recipient for the data using the dynamically determined nearby device, the automatically creating the link comprising:
establishing the link through the nearby device using a first network and a second network, the second network being a 5G networking slice, the establishing including:
transmitting a digital label to the nearby device for use in establishing, at least in part, the link, the digital label including information based on the received request, size of the data to be transferred, and Quality of Service (QoS) requirements.

16. The computer system of claim 15, wherein the link between the first device that contains the data to be transferred and the second device that is an intended recipient for the data is a two-hop network.

17. The computer system of claim 16, wherein the two-hop network comprises:
- the first network that is a local network that connects the first device and the nearby device; and
- the second network that is a 5G networking slice that is generated in response to receiving the request.

18. The computer system of claim 15, wherein the program instructions to dynamically determining a first the nearby device to facilitate the data transfer comprise:
- program instructions to identify devices within a proximity to the first device; and
- program instructions to select the nearby device from the identified devices that satisfies the received request.

19. The computer system of claim 15, wherein the request includes content and one or more parameters needed to facilitate the data transfer.

20. The computer system of claim 15, wherein the program instructions stored on the one or more computer readable storage media further comprise:
- program instructions to receive content to be transferred during the data transfer;
- program instructions to encrypt the received content to be transferred; and
- program instructions to transmit the encrypted content to a blockchain server.

* * * * *